(12) United States Patent
Furusawa et al.

(10) Patent No.: US 8,596,868 B2
(45) Date of Patent: Dec. 3, 2013

(54) MOTION GUIDE DEVICE

(75) Inventors: Ryuji Furusawa, Tokyo (JP); Hideyuki Myoga, Tokyo (JP)

(73) Assignee: THK Co., Ltd., Tokyo (JP)

( * ) Notice: Subject to any disclaimer, the term of this patent is extended or adjusted under 35 U.S.C. 154(b) by 0 days.

(21) Appl. No.: 13/811,608

(22) PCT Filed: Aug. 10, 2011

(86) PCT No.: PCT/JP2011/068291
§ 371 (c)(1),
(2), (4) Date: Jan. 22, 2013

(87) PCT Pub. No.: WO2012/020801
PCT Pub. Date: Feb. 16, 2012

(65) Prior Publication Data
US 2013/0121625 A1    May 16, 2013

(51) Int. Cl.
*F16C 33/00* (2006.01)
*F16C 29/06* (2006.01)

(52) U.S. Cl.
USPC .............................................. 384/15; 384/45

(58) Field of Classification Search
USPC .............. 384/15, 43, 44, 45, 49, 50; 277/551, 277/585, 590, 628, 641, 642, 906, 908
See application file for complete search history.

(56) References Cited

U.S. PATENT DOCUMENTS

| | | | |
|---|---|---|---|
| 4,918,846 A | 4/1990 | Tsukada | |
| 5,634,722 A | 6/1997 | Yuasa et al. | |
| 2008/0279489 A1* | 11/2008 | Kondo | 384/15 |
| 2010/0329595 A1* | 12/2010 | Kuwabara et al. | 384/15 |

FOREIGN PATENT DOCUMENTS

| | | |
|---|---|---|
| JP | 01-082328 U | 6/1989 |
| JP | 01-082330 U | 6/1989 |
| JP | 03-099222 U | 10/1991 |
| JP | 06-020896 Y2 | 6/1994 |
| JP | 06-051549 A | 7/1994 |
| JP | 07-310745 A | 11/1995 |
| JP | 09-042284 A | 2/1997 |
| JP | 2596055 Y2 | 6/1999 |

OTHER PUBLICATIONS

International Search Report of PCT/JP2011/068291, mailing date of Nov. 8, 2011.

* cited by examiner

*Primary Examiner* — James Pilkington
(74) *Attorney, Agent, or Firm* — Westerman, Hattori, Daniels & Adrian, LLP

(57) ABSTRACT

The motion guide device includes: a track rail including insertion holes for fixing bolts; and a moving block assembled to the track rail through intermediation of a large number of rolling elements. The moving block includes an adhering matter path provided at a position opposed to the insertion holes of the track rail, the adhering matter path allowing matters adhering on the track rail to pass from one end to another end of the moving block. A pair of path forming members are fixed to both ends of the moving block in a moving direction thereof. The path forming members each include: a pair of end seal portions which traverse rolling-element rolling surfaces of the track rail and abut against a surface of the track rail; and a path opening portion which is provided between the end seal portions and forms an entrance of the adhering matter path.

4 Claims, 10 Drawing Sheets

MOTION GUIDE DEVICE

TECHNICAL FIELD

The present invention relates to a motion guide device in which a moving block is assembled to a track rail through intermediation of a large number of rolling elements such as balls and rollers, which are endlessly circulated, to thereby enable free reciprocating motion of an article fixed and mounted onto the moving block along the track rail.

BACKGROUND ART

In a linear guiding portion or a curvilinear guiding portion of a work table of a machine tool or any one of various conveying devices, there is heavily used a motion guide device in which a moving block having a movable member such as a table mounted thereon is continuously moved along a track rail. In the motion guide device of this type, the moving block is assembled to the track rail through intermediation of a large number of balls or rollers (hereinafter referred to as "rolling elements"). The rolling elements roll between the moving block and the track rail while applying a load, to thereby enable easy motion of the movable member, which is mounted on the moving block, along the track rail with an extremely small resistance. Further, the moving block includes an endless circulation path for the rolling elements. The rolling elements are circulated in the endless circulation path, to thereby enable continuous movement of the moving block along the track rail.

In the motion guide device configured as described above, depending on the usage environment, foreign matters such as chips of a workpiece or refuse may adhere to the track rail. If those foreign matters enter the moving block running along the track rail, flaws may be generated in a rolling surface of the track rail, a load rolling surface of the moving block, or the rolling elements, or abrasion of those members may be accelerated. As a result, a movement accuracy of the moving block in the motion guide device may be impaired in an early stage. Further, when a coolant used for cooling a workpiece in the machine tool enters the moving block via the track rail, lubricating oil adhering to the surface of the rolling element may be washed out, which may also cause abrasion of the rolling surfaces and the rolling elements in an early stage.

For such reasons, generally, a pair of end seal members are mounted to the moving block at both ends in a moving direction thereof. Each of the end seal members includes an end seal portion which comes into sliding contact with the surface of the track rail, and when the moving block moves along the track rail, the end seal portion wipes the matters adhering on the track rail off the surface of the track rail, thereby preventing the adhering matters from entering the moving block (Patent Literature 1).

Further, in some cases, in order to reliably prevent fine adhering matters from entering the moving block, a plurality of overlapped end seal members are mounted on the end portion of the moving block. That is, in a conventional motion guide device, the matters adhering on the track rail are removed by the end seal member along with the passage of the moving block, and by increasing the reliability of the removal, the adhering matters are prevented from entering the moving block.

CITATION LIST

Patent Literature

[PTL 1]: JP 09-42284 A

DISCLOSURE OF THE INVENTION

Problems to be Solved by the Invention

However, in most cases, the track rail is joined to a fixing portion such as a bed with use of a fixing bolt, and in the track rail, an insertion hole for the fixing bolt is formed in a penetrated manner. Therefore, when the moving block having the end seal member mounted thereon moves along the track rail, the end seal portion of the end seal member being brought into sliding contact with the surface of the track rail is easily caught to a peripheral edge of the insertion hole. Therefore, there has been a possibility that abrasion and damage may occur at a leading end of the end seal portion during use over time. This may cause generation of a gap between the end seal portion and the surface of the track rail. In such a case, the matters adhering on the track rail may pass below the end seal portion to enter the moving block.

Further, even when the end seal portion is held in sliding contact with the surface of the track rail without a gap, the refuse accumulated in the insertion hole passes below the end seal portion, and hence there is a high fear that the adhering matters such as refuse enter the moving block via the insertion hole.

As a countermeasure to solve such problems relating to the presence of the insertion hole in the track rail, it is conceivable to close the insertion hole after the fixing bolt is inserted, which has been performed as appropriate when the track rail is installed. That is, after the fixing bolt is fastened to join the track rail to the fixing portion, a plug is fitted to the insertion hole of the track rail so that the surface of the track rail, which is brought into sliding contact with the end seal portion, is kept smooth without a step.

However, this countermeasure requires an operation of fitting the plug into the insertion hole of the track rail. As the entire length of the track rail becomes larger, the number of the insertion holes increases, and hence it takes a large amount of time and effort for the installing operation of the track rail. Further, in order to level a part of the insertion hole closed by the plug and the surface of the track rail therearound smoothly without a step, it is necessary to carefully fit the plug into the insertion hole. Further, when needed, it is necessary to perform an operation of cutting a top portion of the plug protruded from the surface of the track rail. Also from this point, it takes a large amount of time and effort for the installing operation of the track rail.

On the other hand, it is required that the end seal portion of the end seal member be brought into sliding contact with the surface of the track rail without a gap, and hence the end seal portion is brought into pressure contact with the track rail under elastic deformation. Further, in order to prevent the matters adhering on the track rail from passing below the end seal portion, it is required that the end seal portion be brought into contact with the track rail under a certain level of pressure. Therefore, with the presence of the end seal member, the moving resistance of the moving block with respect to the track rail tends to increase.

Means for Solving the Problems

The present invention has been made in view of the above-mentioned possibilities, and therefore has an object to provide a motion guide device which eliminates a phenomenon that an end seal portion of a path forming member mounted to a moving block is caught to an insertion hole of a track rail, thereby being capable of preventing abrasion and damage of the end seal portion, as well as being capable of reducing moving resistance of the moving block with respect to the track rail.

In order to attain the above-mentioned object, according to the present invention, there is provided a motion guide device, including: a track rail having insertion holes for fixing bolts, the insertion holes being formed in a penetrated manner at an appropriate interval in a longitudinal direction, and having a plurality of rolling-element rolling surfaces which formed along the longitudinal direction so that the insertion holes are interposed therebetween; and a moving block assembled to the track rail through intermediation of a large number of rolling elements to be freely movable along the track rail, the moving block having an endless circulation path for the large number of rolling elements. The moving block is provided an adhering matter path at a position opposed to the insertion holes of the track rail, the adhering matter path allowing matters adhering on the track rail to pass from one end to another end of the moving block. A path forming member forming an entrance of the adhering matter path is fixed to each of both ends of the moving block in a moving direction thereof. The path forming member includes: a pair of end seal portions which traverse the plurality of rolling-element rolling surfaces of the track rail and abut against a surface of the track rail; and a path opening portion which is provided between the pair of end seal portions and forms the entrance of the adhering matter path of the moving block.

Effects of the Invention

In the motion guide device of the present invention as described above, the adhering matter path is provided in the moving block at the position opposed to the insertion holes of the track rail. Therefore, when the moving block is moved along the track rail, the adhering matters around the insertion holes pass below the moving block through the adhering matter path formed in the moving block. On the other hand, the path forming member fixed to each of both the ends of the moving block in the moving direction thereof includes the end seal portion which traverses the rolling-element rolling surface of the track rail and is brought into sliding contact with the surface of the track rail. The matters adhering on the rolling-element rolling surface are removed by the end seal portion along with the movement of the moving block.

Note that, the path forming member includes the path opening portion which forms the entrance of the adhering matter path of the moving block. With the path opening portion, the pair of end seal portions provided in the path forming member are divided. The adhering matter path is opposed to the insertion holes of the track rail, and hence the path opening portion is located at a position opposed to the insertion holes of the track rail as well. Therefore, the end seal portion is not present at the position opposed to the insertion holes of the track rail. That is, in the motion guide device of the present invention, the end seal portion of the path forming member is not caught to the peripheral edge of the insertion hole of the track rail, and thus it is possible to prevent abrasion and damage of the end seal portion during use over time.

Further, according to the motion guide device of the present invention, the end seal portion is not present in a part in which the path opening portion is formed, and hence as compared to the conventional motion guide device, a part in which the end seal portion is brought into sliding contact with the surface of the track rail is smaller. Accordingly, it is possible to reduce the moving resistance of the moving block with respect to the track rail.

MODE FOR CARRYING OUT THE INVENTION

In the following, a motion guide device of the present invention is described in detail with reference to the attached drawings.

Figure 1:
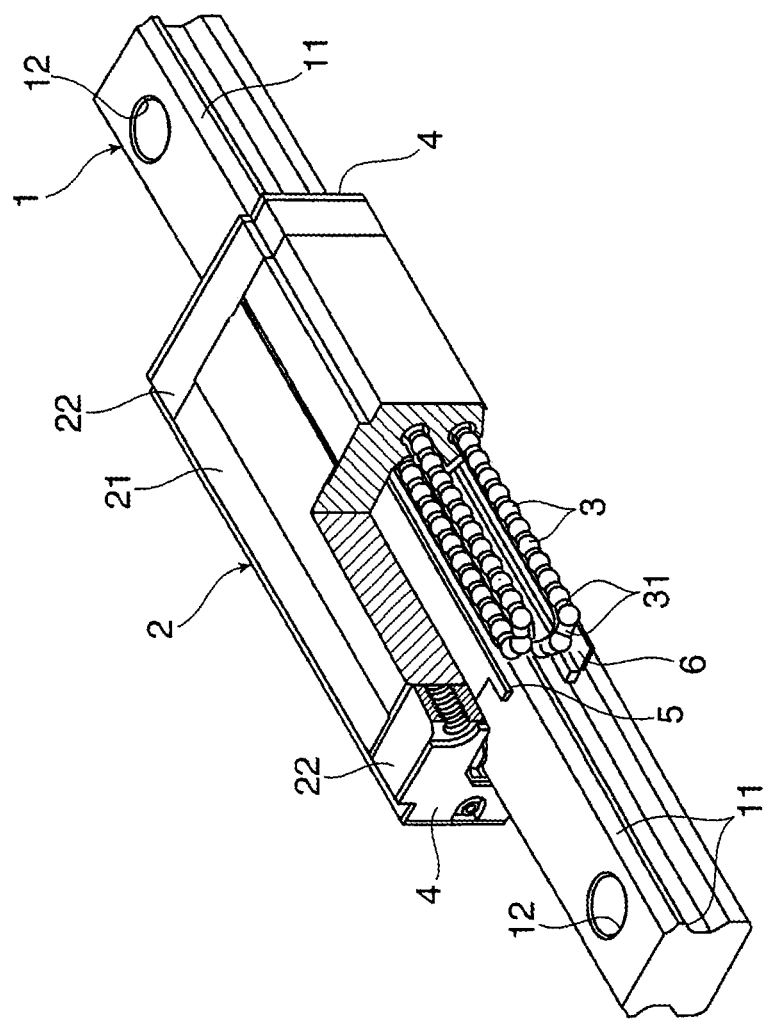
FIG. 1 is a perspective view illustrating an example of a motion guide device of the present invention.

FIG. 1 illustrates an embodiment of a motion guide device to which the present invention is applied. The motion guide device includes a linearly-formed track rail 1, a moving block 2 which is assembled to the track rail 1 through intermediation of balls 3 as rolling elements and includes an endless circulation path for the balls 3 therein, and a pair of path forming members 4 which are fixed to both ends of the moving block 2 in its moving direction and are brought into close contact with the track rail 1. When the balls 3 roll on the track rail and circulate in the endless circulation path of the moving block 2, the moving block 2 reciprocates on the track rail 1. Note that, in FIG. 1, for easier understanding of the internal structure of the moving block 2, a part thereof is illustrated in a cutout manner.

The track rail 1 is formed into a substantially rectangular shape in cross section, and two rolling-element rolling surfaces 11 on which the balls 3 roll are formed in each side surface of the track rail 1 in a longitudinal direction. Further, the track rail 1 includes insertion holes 12 which are formed in a penetrated manner at an appropriate interval in the longitudinal direction. Fixing bolts are inserted through the insertion holes 12, and the fixing bolts are fastened to a fixing portion, such as a bed or a column, of any one of various mechanical devices. In this manner, the track rail 1 can be installed to the mechanical apparatus. Note that, the track rail 1 of this embodiment includes four rolling-element rolling surfaces 11, but the number of the rolling-element rolling surfaces 11 and the arrangement thereof can be set and changed as appropriate depending on the application of the motion guide device and the magnitude of the load to be applied.

On the other hand, the moving block 2 includes a metallic block main body 21, and a pair of lid members 22 fixed to both front and rear end surfaces of the block main body 21 in its moving direction. The block main body 21 includes four load rolling surfaces opposed to the rolling-element rolling surfaces 11 of the track rail 1, and also includes ball returning holes, which correspond to the respective load rolling surfaces and each have an inner diameter slightly larger than the diameter of the ball 3. The load rolling surface is opposed to the rolling-element rolling surface 11 of the track rail 1, to thereby form a load path on which the balls 3 roll while applying a load which acts to the moving block 2.

On the other hand, each of the lid members 22 has a substantially U-shaped direction changing path for causing the balls to come and go between the load path and the ball returning hole. Each of the lid members includes four direction changing paths corresponding to the respective four load rolling surfaces of the block main body. When the moving block moves in one direction along the track rail, each of the direction changing paths provided in one lid member sends the balls 3 that have rolled on the load path and become in an unloaded state into the ball returning hole of the block main body 21, and each of the direction changing paths provided in the other lid member sends the balls 3 rolling in the ball returning hole in the unloaded state into the entrance of the load path. That is, the pair of lid members 22 are fixed to both the end surfaces of the block main body 21, and thus the endless circulation path for the balls 3 is completed in the moving block 2. Note that, the adjacent balls 3 housed in the endless circulation path are protected by a belt 31 made of a synthetic resin in order to maintain the aligned state of those balls 3.

Figure 2:
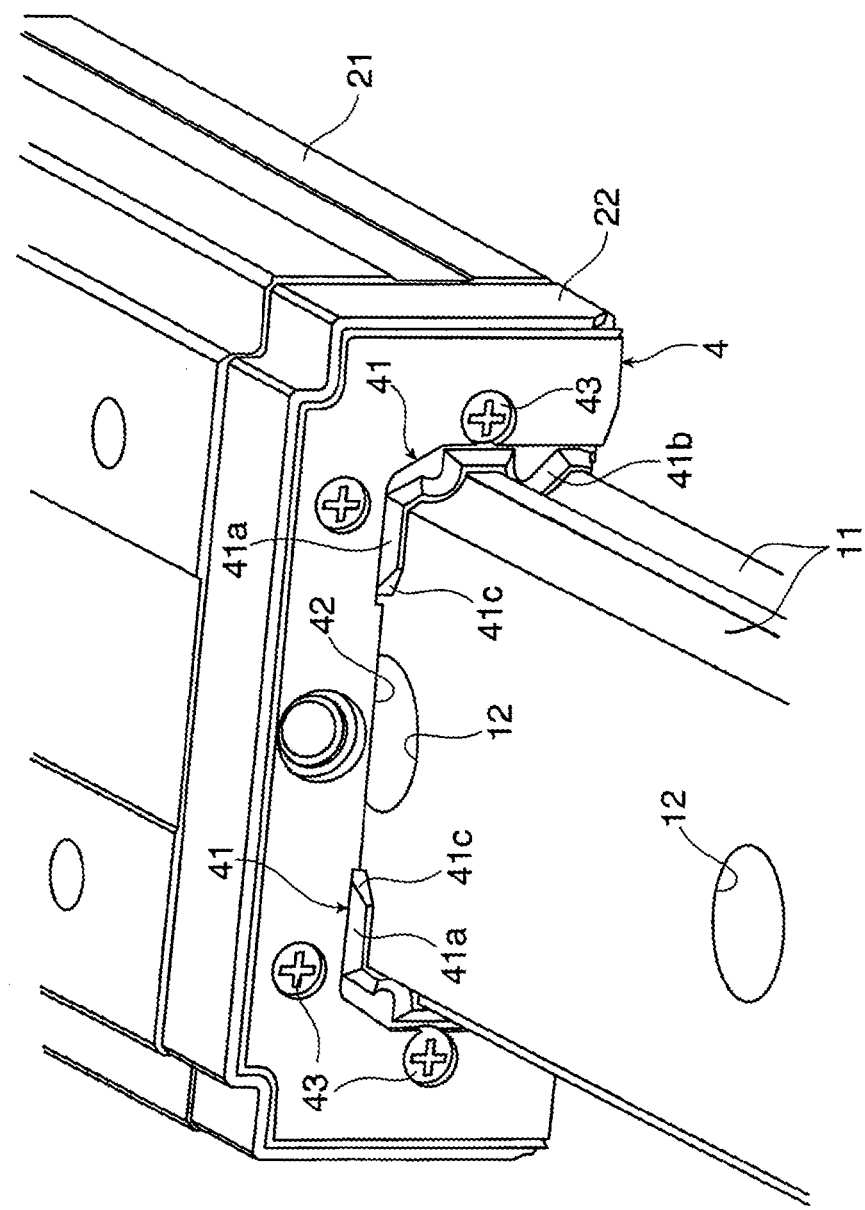
FIG. 2 is a perspective view illustrating a first embodiment of a path forming member included in the motion guide device of the present invention.
Figure 3:
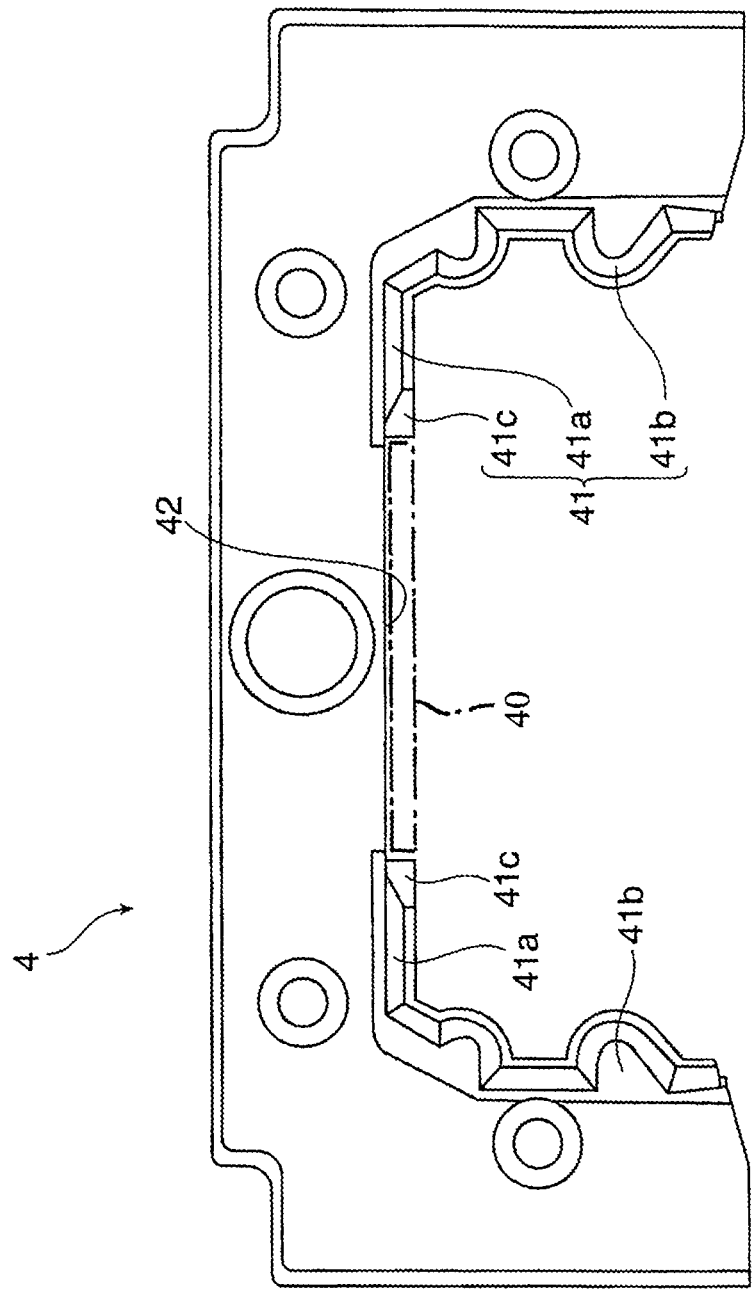
FIG. 3 is a front view of the path forming member illustrated in FIG. 2.

FIGS. 2 and 3 illustrate a first embodiment of the pair of path forming members 4 fixed to the respective lid members 22. Each of the path forming members 4 is fixed to the moving block 2 on the outer side in the moving direction from above each lid member 22 with fixation bolts 43. The path forming member 4 is formed into a channel shape and has a guide groove having a sectional shape that is slightly larger than the sectional shape of the track rail 1. A pair of end seal portions 41 are provided to an edge portion of the guide groove, and are brought into sliding contact with the surface of the track rail 1. Further, a path opening portion 42 is formed between the pair of end seal portions 41 so as to correspond to the insertion holes 12 of the track rail 1.

The path forming member 4 is formed by adhering, through vulcanization an elastic body such as urethane rubber to a surface of a metal thin plate having the guide groove. Each of the end seal portions 41 is formed of the elastic body. Therefore, the path forming member 4 is assembled to the track rail 1 while the end seal portions 41 are slightly pressed.

Each of the end seal portions 41 includes a first seal portion 41a which is brought into sliding contact with the upper surface of the track rail 1, and a second seal portion 41b which traverses the rolling-element rolling surfaces 11 of the track rail 1 and is brought into sliding contact with the side surface of the track rail 1. The first seal portion 41a includes, at a position adjacent to the path opening portion 42, an inclined removing surface 41c which is inclined toward the path opening portion 42.

Figure 4:
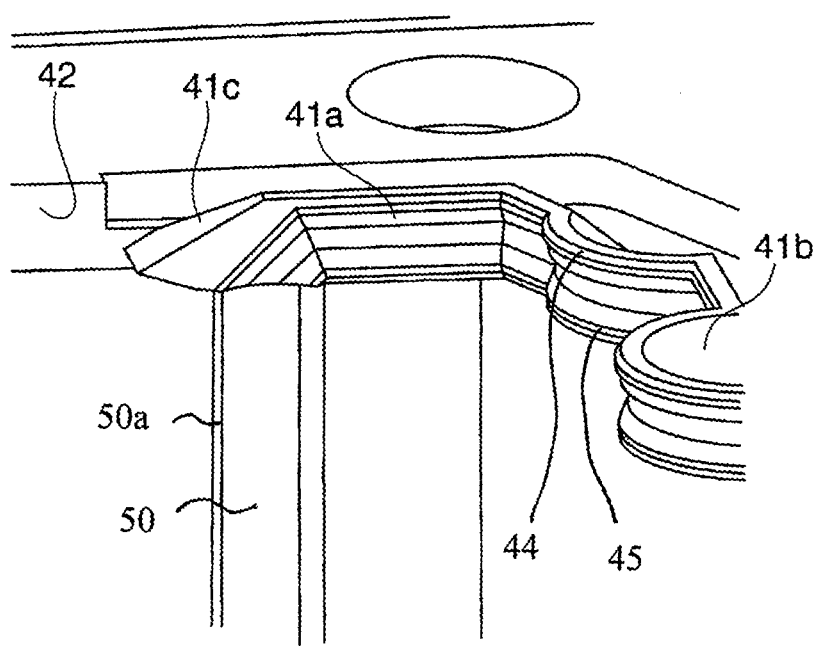
FIG. 4 is an enlarged view illustrating details of an end seal portion of the path forming member.

FIG. 4 is a perspective view illustrating an abutment part of the end seal portion 41 with respect to the track rail 1. The first seal portion 41a and the second seal portion 41b forming the end seal portion 41 each include seal lips 44 and 45 arranged in a doubled manner at a contact end with respect to the track rail 1. The seal lip 44, which is positioned on the outer side with respect to the moving block 2, is a dust lip, and mainly acts with respect to the matters adhering on the track rail 1 in the traveling direction of the moving block 2, to thereby remove the adhering matters from the track rail 1 along with the motion of the moving block 2. Further, the seal lip 45, which is arranged in proximity to the moving block 2, is an oil lip, and prevents lubricating oil such as grease filled in the moving block 2 from adhering to the track rail 1 to flow out from the moving block 2. Each of the seal lips 44 and 45 has a tapered leading end portion which abuts against the track rail 1, thereby preventing the surface pressure from increasing when the seal lip is brought into contact with the track rail 1. The dust lip 44 of the first seal portion 41a and the dust lip 44 of the second seal portion 41b are continuous to each other without interruption, and further, the oil lip 45 of the first seal portion 41a and the oil lip 45 of the second seal portion 41b are similarly continuous to each other. Further, a groove is formed between the dust lip 44 and the oil lip 45. The dust lip 44 and the oil lip 45 are independently brought into contact with the surface of the track rail 1.

Further, the inclined removing surface 41c formed in the first seal portion 41a adjacently to the path opening portion 42 is continuous to the dust lip 44 of the first seal portion 41a, and has a function of pushing out the adhering matters removed from the upper surface of the track rail 1 by the first seal portion 41a in the direction of the path opening portion 42 along with the traveling of the moving block 2.

Note that, in this embodiment, the end seal portion 41 has a doubled seal lip structure, but even when the end seal portion 41 has a single seal lip structure, there is no problem in carrying out the present invention.

The two path forming members 4 configured as described above are fixed to the both front and rear ends of the moving block 2 in the moving direction. When the moving block 2 is moved along the track rail 1, the pair of end seal portions 41 included in each of the path forming members 4 function so as to remove the matters adhering on the track rail 1. As a result, the adhering matters deposit on the end seal portions 41 positioned on the front side in the traveling direction of the moving block 2 at the contact ends thereof with respect to the track rail 1. Note that, the path opening portion 42 is provided between the pair of end seal portions 41. In the path opening portion 42, the matters adhering on the track rail 1 are not removed and directly enter the moving block 2. A gap which is narrower than the diameter of the ball 3 is present between the track rail 1 and the moving block 2, and hence the adhering matters entering the moving block 2 from the path opening portion 42 positioned on the front side in the traveling direction of the moving block 2 are not removed, and are directly discharged outside of the moving block 2 from the path opening portion 42 positioned on the rear side in the traveling direction.

That is, the two path forming members 4 are mounted to the moving block 2, and thus the moving block 2 is provided with an adhering matter path 40 (indicated by a dashed-dotted line in FIG. 3) for causing the matters adhering on the track rail 1 to pass from one end to the other end of the moving block 2. The adhering matter path 40 is provided at a position opposed to the insertion holes 12 of the track rail 1, and thus the insertion holes 12 pass through the adhering matter path along with the traveling of the moving block 2. Further, the path opening portion 42 formed in the path forming member 4 is configured as an entrance or an exit of the adhering matter path 40 provided in the moving block 2.

Therefore, in the motion guide device of the present invention, the matters adhering on the upper surface of the track rail 1, particularly, the adhering matters around the insertion hole 12 for the fixing bolt are not removed by the path forming member 4 and pass inside the moving block 2. Thus, the adhering matters remain on the track rail 1 as they are.

According to the motion guide device of the present invention configured as described above, the path forming member 4 includes the path opening portion 42 formed at the position opposed to the insertion holes 12 of the track rail 1, and no end seal portion 41 which abuts against the track rail is present in the part at which the path opening portion 42 is formed. Therefore, even when the moving block 2 is moved along the track rail 1, unlike the conventional case, a seal member for hermetically sealing a gap between the track rail 1 and the moving block 2 is not caught to a peripheral edge of the insertion hole 12 of the track rail 1. Thus, it is possible to prevent abrasion and damage of the seal member during use over time.

Further, it is unnecessary to concern about abrasion and damage of the seal member to be caused by the insertion hole 12 of the track rail 1, and hence it is unnecessary to ensure smoothness of the surface of the track rail 1 by fitting a plug to the insertion hole 12 of the track rail 1. Accordingly, man-hours for the installing operation of the track rail 1 can be reduced, and it is possible to easily perform the mounting operation of the motion guide device with respect to a mechanical apparatus or the like.

Further, in the motion guide device of the present invention, because the path opening portion 42 is present, the length of the end seal portion 41 of the path forming member 4, which is held in contact with the track rail 1 under pressure, becomes smaller as compared to the conventional motion guide device. Therefore, it is possible to reduce the moving resistance of the moving block 2 with respect to the track rail 1.

Still further, when the inclined removing surface 41c is formed with respect to the end portion of the first seal portion 41a adjacent to the path opening portion 42, the inclined removing surface 41c guides, toward the adhering matter path 40, part of the adhering matters removed from the surface of the track rail 1 by the first seal portion 41a, and hence it is possible to suppress excessive deposition of the adhering matters on the first seal portion 41a. Therefore, when such an inclined removing surface 41c is formed, it is possible to further reduce the moving resistance of the moving block 2 with respect to the track rail 1.

Figure 5:
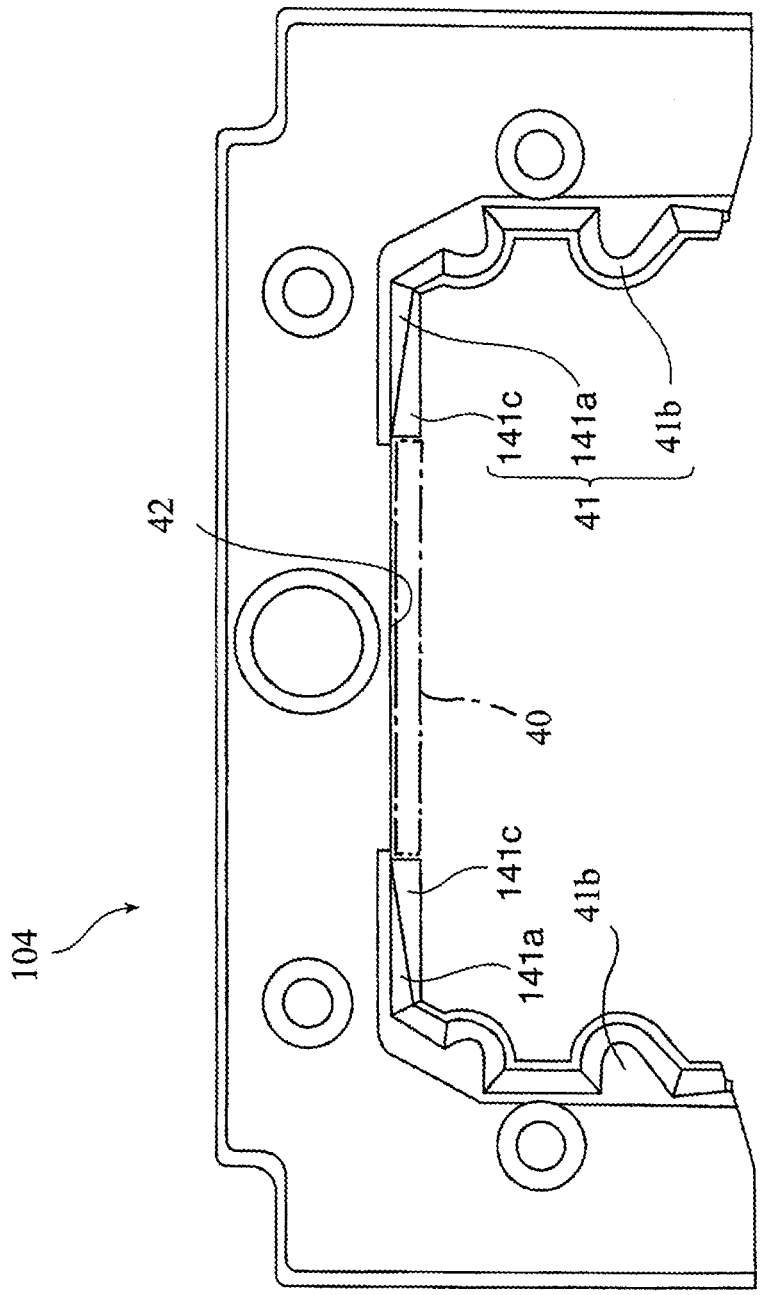
FIG. 5 is a front view illustrating a second embodiment of the path forming member.

FIG. 5 is a front view illustrating a second embodiment of the path forming member.

In the path forming member 4 of the first embodiment described above, the inclined removing surface 41c is formed only at a part of the first seal portion 41a adjacent to the path opening portion 42. However, in a path forming member 104 of the second embodiment, an entire leading end of a first seal portion 141a, which abuts against the upper surface of the track rail, is formed as an inclined removing surface 141c. Therefore, when the moving block 2 having the path forming member 104 of the second embodiment mounted thereon is moved along the track rail 1, due to the function of the inclined removing surface 141c formed in the entire region of the first seal portion 141a, almost all matters adhering on the upper surface of the track rail 1 are pushed in the direction of the path opening portion 42. Note that, in FIG. 5, the same configurations are those of the first embodiment are denoted by the same reference symbols as the first embodiment, and detailed description thereof is omitted herein.

Therefore, according to the path forming member 104 of the second embodiment, almost all adhering matters removed from the upper surface of the track rail by the first seal portion 141a can be guided toward the adhering matter path 40. Therefore, the adhering matters are prevented from being deposited on the leading end of the first seal portion 141a, and the moving block 2 having the path forming member 104 mounted thereon can be moved more smoothly with respect to the track rail 1.

On the other hand, considering the risk that the refuse and coolant adhering to the upper surface of the track rail 1 and passing through the adhering matter path 40 of the moving block 2 enter the rolling-element rolling surface 11 adjacent to the adhering matter path 40 during passage through the adhering matter path 40, a pair of inner seal portions are preferred to be provided on the lower surface of the moving block 2, which is opposed to the upper surface of the track rail 1.

Figure 6:
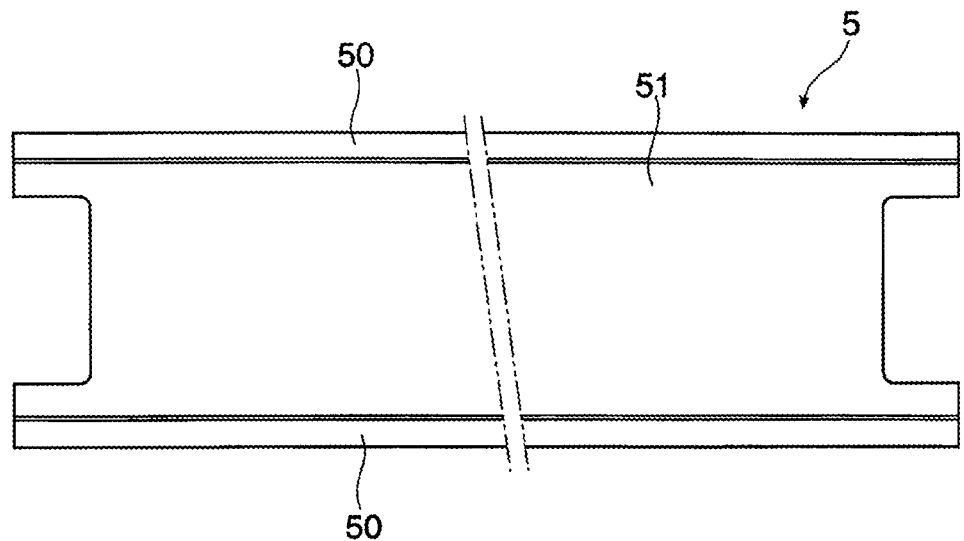
FIG. 6 is a plan view illustrating an inside seal plate including an inner seal portion.
Figure 7:
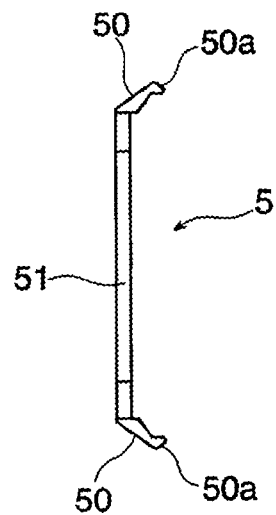
FIG. 7 is a front view of the inside seal plate illustrated in FIG. 6.

FIGS. 6 and 7 illustrate an inside seal plate 5 including the inner seal portions 50. As illustrated in FIG. 1, the inside seal plate 5 is mounted to the lower surface of the moving block 2 at a position opposed to the upper surface of the track rail 1. The inside seal plate 5 includes a metallic fixing plate 51 having a width slightly smaller than the width of the upper surface of the track rail 1, and the pair of inner seal portions 50 provided along respective long sides of the fixing plate 51. Each of the inner seal portions 50 is formed of an elastic body such as urethane rubber, and is adhered through vulcanization to the long side of the fixing plate at the same time of molding.

Each of the inner seal portions 50 is provided along the rolling-element rolling surface 11 of the track rail 1, and abuts against the upper surface of the track rail 1 provided with the insertion holes 12. Thus, the insertion holes 12 of the track rail 1 are positioned between the pair of inner seal portions 50. That is, the fixing plate 51 is provided so as to cover the insertion holes 12 of the track rail 1 from above. Further, the leading end of each of the inner seal portions 50, which is brought into contact with the track rail 1, is formed as a tapered seal lip 50a, thereby preventing the surface pressure from increasing when the seal lip is brought into contact with the track rail 1. Note that, in the embodiment illustrated in FIGS. 6 and 7, only the single seal lip 50a is provided to the inner seal portion 50, but in a case where further improvement of the dust prevention effect is desired, the inner seal portion 50 may have a doubled seal lip structure.

Under a state in which the path forming members 4 and the inside seal plate 5 are mounted to the moving block, both longitudinal ends of the inner seal portion 50 abut against the end seal portions 41 of the path forming members 4 from the rear surface side, respectively, and thus the end seal portion 41 and the inner seal portion 50 are connected to each other. FIG. 4 illustrates the inner seal portion 50 abutting against the rear surface side of the end seal portion 41. Specifically, the end portion of the inner seal portion 50 abuts against the rear surface side of the first seal portion 41a abutting against the upper surface of the track rail 1. With this abutment, the dust lip 44 of the first seal portion and the seal lip 50a of the inner seal portion 50 are continuous to each other.

Figure 8:
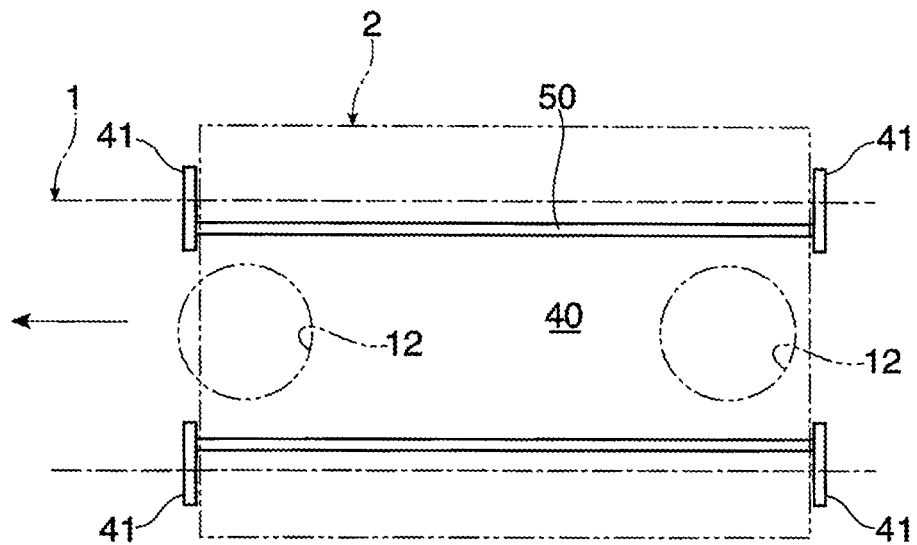
FIG. 8 is a schematic view illustrating a first embodiment of a connection structure between the end seal portion and the inner seal portion.

That is, when such an inner seal portion 50 is provided and both the longitudinal ends of the inner seal portion 50 are connected to the end seal portions 41 of the path forming members 4, respectively, as illustrated in FIG. 8, the pair of end seal portions 41 positioned at both the ends of the moving block 2 and the inner seal portion 50 become continuous to each other without a gap. As a result, between the upper surface of the track rail 1 and the moving block 2, there is completed the adhering matter path 40 which is sectioned in a width that does not interfere with the insertion holes 12. With this, the matters adhering on the track rail, which pass through the adhering matter path 40 along with the movement of the moving block 2 in the arrow direction with respect to the track rail 1, are effectively prevented from entering the rolling-element rolling surface 11 of the track rail 1.

Figure 9:
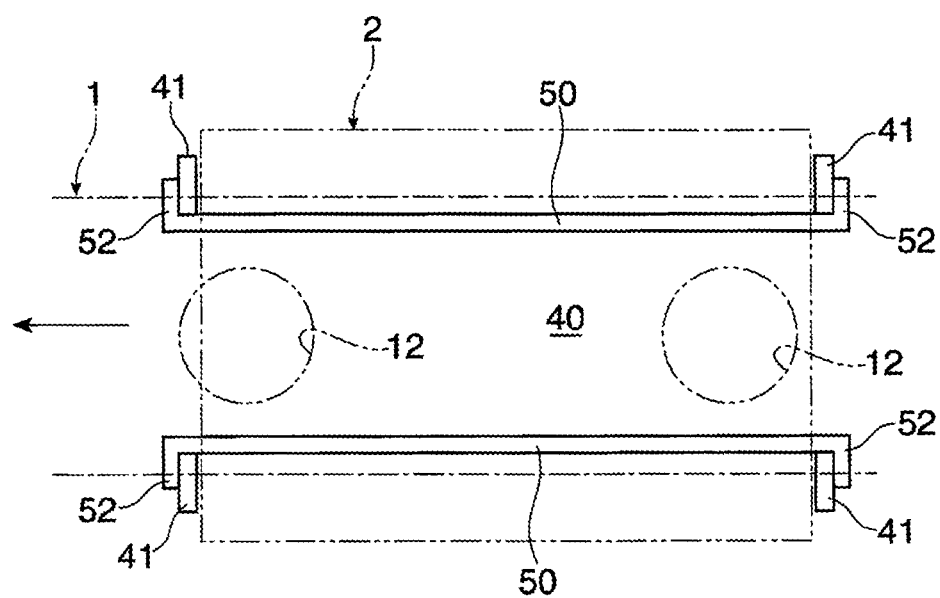
FIG. 9 is a schematic view illustrating a second embodiment of the connection structure between the end seal portion and the inner seal portion.

FIG. 9 illustrates a second embodiment of the connection structure between the end seal portion 41 and the inner seal portion 50. In the connection structure illustrated in FIG. 8, the longitudinal end surface of the inner seal portion 50 strikes against the rear surface of the end seal portion 41. However, in the embodiment illustrated in FIG. 9, a pair of coupling seal portions 52 bent with respect to the inner seal portion 50 are provided to both the longitudinal ends of the inner seal portion 50, and each of the coupling seal portions 52 abuts against the end seal portion 41 of the path forming member 4 mounted on each of both the ends of the moving block 2.

When the coupling seal portion 52 is caused to abut against the end seal portion 41, a leading end of the coupling seal portion 52 may be connected to a leading end of the end seal portion 41, which faces the path opening portion 42, but from the viewpoint of hermetically sealing the boundary between the inner seal portion 50 and the end seal portion 41 reliably, it is preferred that, when the coupling seal portion 52 is caused to abut against the end seal portion 41, both members be arranged so as to be overlapped with each other by a certain length. With this, the boundary between the inner seal portion 50 and the end seal portion 41 can be hermetically sealed with high accuracy, and it is possible to effectively prevent the matters adhering on the track rail 1, which pass through the adhering matter path 40, from entering the rolling-element rolling surface 11 of the track rail 1.

Further, as illustrated in FIG. 9, the coupling seal portion 52 bent with respect to the inner seal portion 50 is overlapped with the surface of the end seal portion 41 on the outer side, that is, the surface on a side opposite to the moving block 2. When the inner seal portion 50 is fixed to the moving block 2 under this state, the boundary between the inner seal portion 50 and the end seal portion 41 can be hermetically sealed with higher accuracy. In this case, the entire length of the inner seal portion 50 is formed larger than that of the moving block 2.

When the coupling seal portion 52 is overlapped with the outer surface of the end seal portion 41 as described above, the boundary surface between the inner seal portion 50 and the end seal portion 41 is not present in the adhering matter path 40. Therefore, it is possible to prevent more effectively a disadvantage that refuse, coolant, and the like passing through the adhering matter path 40 enter the rolling-element rolling surface 11 of the track rail 1.

Figure 10:
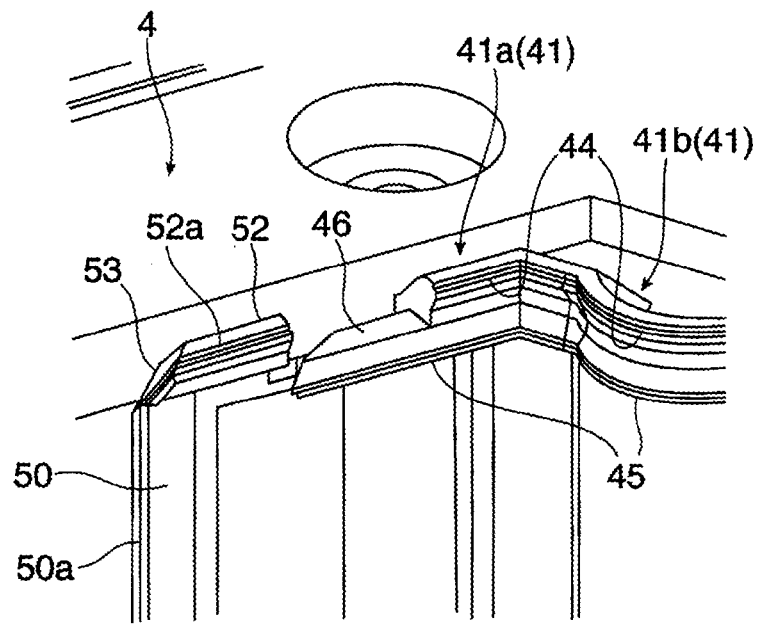
FIG. 10 is a perspective view illustrating details of the connection structure illustrated in FIG. 9, which illustrates a state in which the end seal portion and the inner seal portion are separated from each other.
Figure 11:
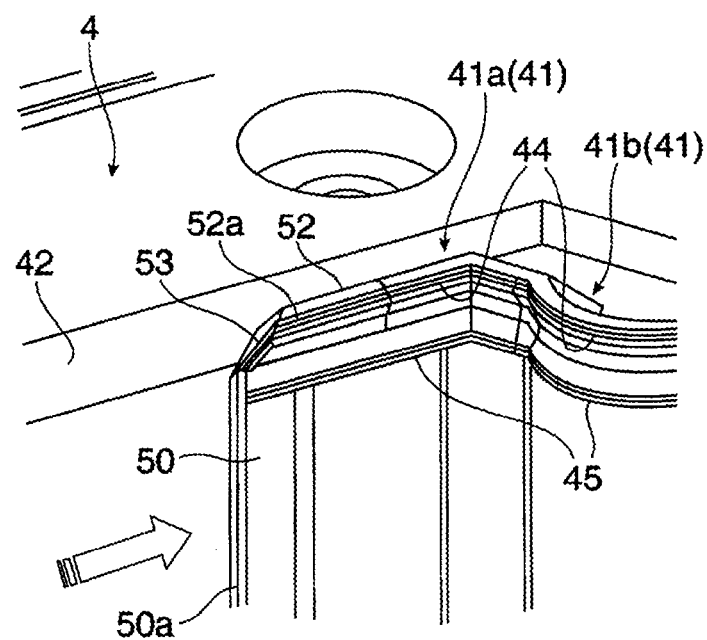
FIG. 11 is a perspective view illustrating details of the connection structure illustrated in FIG. 9, which illustrates a state in which the end seal portion and the inner seal portion are connected to each other.

FIGS. 10 and 11 specifically illustrate the connection structure between the end seal portion 41 and the inner seal portion 50 illustrated in FIG. 9. FIG. 10 illustrates a state in which the inner seal portion 50 and the end seal portion 41 are separated from each other, and FIG. 11 illustrates a state in which the inner seal portion 50 is slid in the arrow direction to connect to the end seal portion 41. The end seal portion 41 includes a recess 46 formed by cutting out a part of the first seal portion 41a adjacent to the path opening portion 42. The coupling seal portion 52 protruded from the inner seal portion 50 is fitted to the recess 46.

More specifically, the recess 46 is formed by cutting out the dust lip 44 of the first seal portion 41a, while the coupling seal portion 52 includes a seal lip 52a formed continuous from the seal lip 50a of the inner seal portion 50. Therefore, when the coupling seal portion 52 is fitted to the recess 46 of the end seal portion 41, the coupling seal portion is arranged so as to overlap with the oil lip of the first seal portion, and the seal lip 52a of the coupling seal portion 52 is connected to the dust lip 44 of the first seal portion 41a. In this manner, there is formed a seal structure continuous from the first seal portion 41a to the inner seal portion 50.

Further, the seal lip 52a connecting together the dust lip 44 of the first seal portion 41a and the seal lip 50a of the inner seal portion 50 is formed in the coupling seal portion 52, and hence an inclined removing surface 53 is formed at a corner portion at which the inner seal portion and the coupling seal portion intersect with each other. The inclined removing surface 53 exerts the same function as the inclined removing surface 41c formed in the first seal portion in the first embodiment, and causes the matters which are adhering on the track rail 1 and are then deposited on the leading end of the seal lip 52a of the coupling seal portion 52 to move in the direction of the path opening portion 42 along with the motion of the moving block 2, thereby preventing the adhering matters from depositing on the coupling seal portion 52.

In the embodiment illustrated in FIGS. 10 and 11, as indicated by an arrow in FIG. 11, the inner seal portion 50 is slid in the direction orthogonal to its longitudinal direction. In this manner, it becomes possible to simultaneously combine the coupling seal portions 52 formed at both the longitudinal ends of the inner seal portion 50 to the pair of end seal portions 41 positioned on the front and rear sides of the moving block 2 in the moving direction. Therefore, it is difficult to form the pair of inner seal portions 50 facing each other across the insertion hole 12 of the track rail 1 as a single inside seal plate 5 as illustrated in FIG. 6, and it is preferred to mount the individual inner seal portions 50 separately to the moving block 2.

Further, in the embodiment illustrated in FIG. 9, two overlapped path forming members 4 may be mounted to each of both the ends of the moving block 2, and the coupling seal portion 52 may be sandwiched between the overlapped end seal portions 41.

Figure 12:
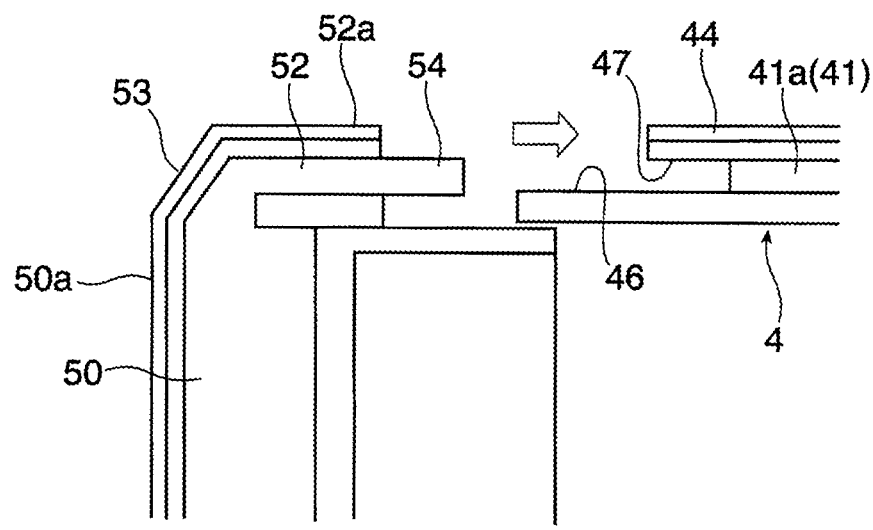
FIG. 12 is a view schematically illustrating the connection structure between the end seal portion and the inner seal portion illustrated in FIGS. 10 and 11.

FIG. 12 schematically illustrates the connection structure between the inner seal portion 50 and the end seal portion 41 of the path forming member 4 illustrated in FIGS. 10 and 11. In the connection structure illustrated in FIGS. 10 and 11, the coupling seal portion 52 protruded from the inner seal portion 50 is simply fitted to the recess 46 of the end seal portion 41, and hence the coupled state between the inner seal portion 50 and the end seal portion 41 becomes unstable during motion of the moving block 2, which leads to a fear that a gap may be generated between the coupling seal portion 52 and the dust lip 44 of the first seal portion 41a. As a countermeasure, as illustrated in FIG. 12, a fitting protrusion 54 is formed at the leading end of the coupling seal portion 52, while a locking groove 47 for receiving the fitting protrusion 54 is formed in the first seal portion 41a. Under a state in which the inner seal portion 50 and the end seal portion 41 are connected to each other, the fitting protrusion 54 is fitted to the locking groove 47 to be held.

With such a connection structure, it is possible to connect the inner seal portion 50 to the end seal portion 41 more firmly, and prevent the connection between the inner seal portion 50 and the end seal portion 41 from being loosened during the motion of the moving block 2 with respect to the track rail 1. Thus, it is possible to secure continuity between the coupling seal portion 52 and the dust lip 44 of the first seal portion 41a.

Figure 13:
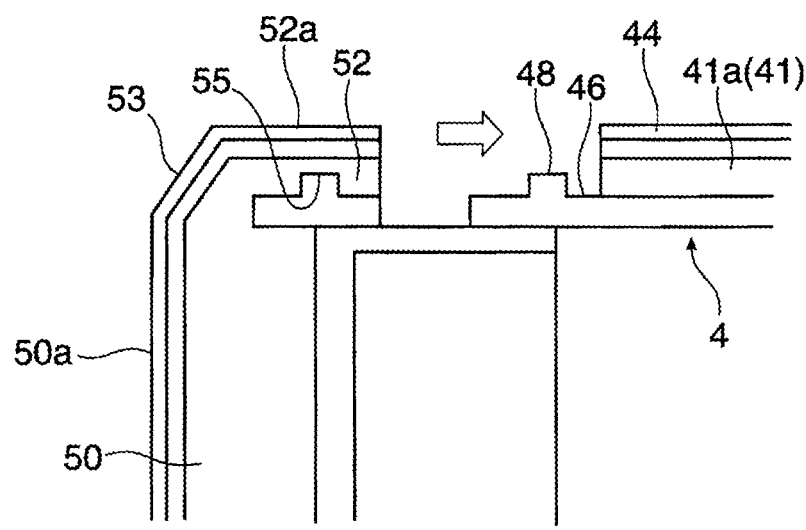
FIG. 13 is a schematic view illustrating a modified example of the connection structure illustrated in FIG. 12.

FIG. 13 is a schematic view illustrating a modified example of the connection structure illustrated in FIG. 12. In this connection structure, a locking protrusion 48 protruding in a direction orthogonal to the mounting direction (arrow direction in FIG. 13) of the inner seal portion 50 is provided in the recess 46 of the end seal portion 41, while a holding hole 55 to which the locking protrusion 48 is fitted is provided in the coupling seal portion 52 protruded from the inner seal portion 50. With this configuration, under a state in which the coupling seal portion 52 is fitted to the recess 46 of the first seal portion 41a, the locking protrusion 48 is inserted into the holding hole 55.

When the moving block 2 and the path forming member 4 as well as the inner seal portion 50 are manufactured, processing errors thereof cannot be completely eliminated. Therefore, when the pair of coupling seal portions 52 protruded from the inner seal portion 50 are connected to the pair of end seal portions 41 provided at both the ends of the moving block 2, respectively, as described above, depending on accumulation of the processing errors, an interval between the pair of coupling seal portions 52 may be slightly larger or smaller than that of the pair of end seal portions 41. In the structure illustrated in FIG. 13, a slight gap is provided in a fitting state between the coupling seal portion 52 and the recess 46 in the longitudinal direction of the inner seal portion 50, and hence even when the processing errors are generated, the coupling seal portion 52 can be fitted to the recess 46 of the first seal portion 41a. Further, even when the fitting state of the coupling seal portion 52 with respect to the recess 46 of the first seal portion 41a is loose, the locking protrusion 48 is locked in the holding hole 55, and hence the coupling seal portion 52 does not slip out from the recess 46, and the connection state between the inner seal portion 50 and the end seal portion 41 can be secured. Therefore, the height of the locking protrusion 48 is determined in consideration of the maximum accumulated amount of dimension errors of respective members along the moving direction of the moving block 2.

Note that, in FIG. 13, the locking protrusion 48 is formed in the recess 46 of the end seal portion 41, and the holding hole 55 is formed in the coupling seal portion 52, but this relationship may be reversed. Further, for example, the fitting protrusion 54 illustrated in FIG. 12 may include similar locking protrusions on its front and rear sides.

Further, the motion guide device of the present invention is not always used while installing the track rail 1 on a horizontal surface, and is used while installing the track rail 1 on a wall surface in many cases. In such cases, refuse and coolant easily adhere to the side surface of the track rail 1, in which the rolling-element rolling surface 11 is formed, and there is a fear that those adhering matters may enter the moving block 2 from a gap between the side surface of the track rail 1 and the moving block 2. Therefore, in such a usage environment, as illustrated in FIG. 1, it is preferred that a side seal portion 6 for closing the gap between the side surface of the track rail 1 and the moving block 2 be provided along the longitudinal direction of the track rail 1. When this side seal portion 6 is provided, it is possible to prevent matters adhering on the side surface of the track rail 1 from entering the moving block 2.

Figure 14:
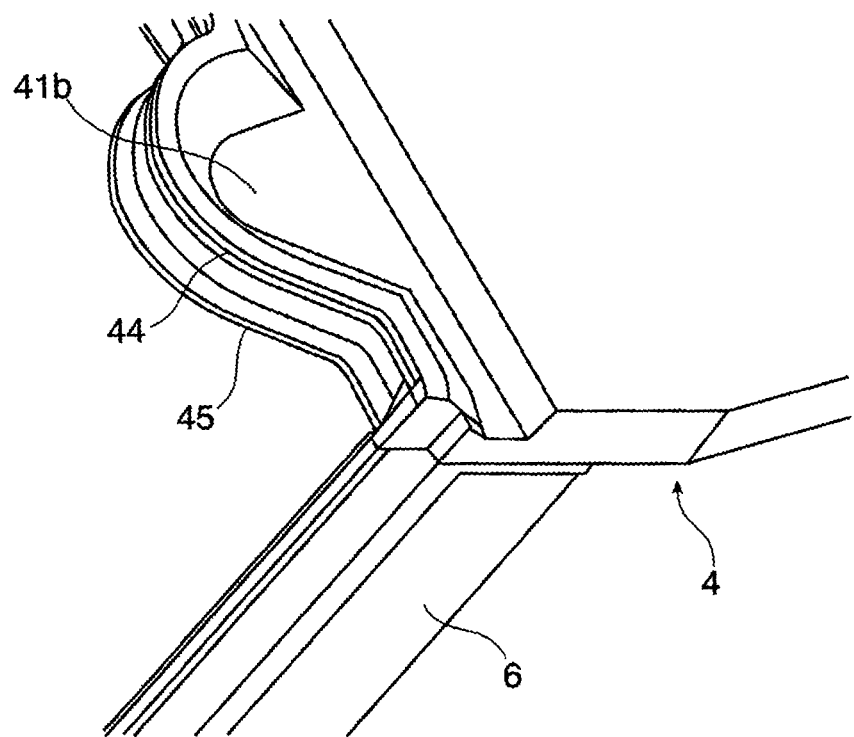
FIG. 14 is an enlarged view illustrating a part at which the path forming member and a side seal portion are coupled to each other.

When the side seal portion 6 is provided as described above, as illustrated in FIG. 14, it is preferred to establish connection between the side seal portion 6 and the second seal portion 41b without a gap by striking a longitudinal end portion of the side seal portion 6 against a rear surface side of the second seal portion 41b of the end seal portion 41.

Further, regarding the connection structure between the side seal portion and the second seal portion, it is possible to adopt a connection structure between the first seal portion 41a and the inner seal portion 50 described with reference to FIGS. 10 and 11. That is, coupling seal portions are provided at both longitudinal end portions of the side seal portion 6 so that the coupling seal portions are each overlapped with the second seal portion 41b. In this manner, the side seal portion 6 and the end seal portion 41 can be connected to each other.

When the end portion of the side seal portion and the end seal portion are connected to each other as described above, in combination with the connection structure between the inner seal portion and the end seal portion as described above, a hermetical sealing structure can be provided so as to surround the load rolling surface of the moving block 2. That is, the region on the track rail 1, in which the balls 3 roll, is surrounded by the path forming member 4, the inner seal portion 5, and the side seal portion 6, which are connected to one another. Thus, it is possible to prevent entering of matters adhering on the track rail 1 in the rolling region.

Note that, in the motion guide device according to the embodiments described above, the track rail having a linear shape is formed, but the track rail may be formed to have an arc shape with a constant curvature.

Further, in the above-mentioned embodiments, a ball is used as the rolling element, but a roller may be applied instead.

The invention claimed is:

1. A motion guide device, comprising:
   a track rail having insertion holes for fixing bolts, the insertion holes being formed in a penetrated manner at an interval in a longitudinal direction, and having a plurality of rolling-element rolling surfaces which formed along the longitudinal direction so that the insertion holes are interposed therebetween; and
   a moving block assembled to the track rail through intermediation of a plurality of rolling elements to be freely movable along the track rail, the moving block having an endless circulation path for the plurality of rolling elements,
   wherein the moving block is provided with an adhering matter path at a position opposed to the insertion holes of the track rail, the adhering matter path allowing matters adhering on the track rail to pass from one end to another end of the moving block,
   wherein a path forming member forming an entrance of the adhering matter path is fixed to each of both ends of the moving block in a moving direction thereof, the path forming member comprising:
      a pair of end seal portions which traverse the plurality of rolling-element rolling surfaces of the track rail and abut against a surface of the track rail; and
      a path opening portion which is provided between the pair of end seal portions and forms the entrance of the adhering matter path of the moving block, and
   wherein each of the pair of end seal portions of the path forming member comprises an inclined removing surface for moving the matters adhering on the track rail toward the path opening portion, the inclined removing surface being formed adjacent to the path opening portion.

2. The motion guide device according to claim 1, wherein the moving block further comprises a pair of inner seal portions for sectioning the adhering matter path by extending along the plurality of rolling-element rolling surfaces of the track rail and abutting against an upper surface of the track rail, the pair of inner seal portions being positioned on both sides with respect to the insertion holes of the track rail so that the insertion holes are interposed therebetween, and wherein each of the pair of inner seal portions has both longitudinal ends each connected to corresponding one of the pair of end seal portions of the path forming member.

3. The motion guide device according to claim 2, wherein the each of the pair of inner seal portions comprises a pair of coupling seal portions provided at both the longitudinal ends thereof, the pair of coupling seal portions being bent with respect to corresponding one of the pair of inner seal portions, and wherein each of the pair of coupling seal portions abuts against corresponding one of the pair of end seal portions.

4. The motion guide device according to claim 3, wherein the pair of inner seal portions are fixed to the moving block under a state in which the each of the pair of coupling seal portions is overlapped with a surface of the corresponding one of the pair of end seal portions on a side opposite to the moving block.

\* \* \* \* \*